No. 811,035. PATENTED JAN. 30, 1906.
J. H. CHIDESTER.
ADJUSTABLE WASHER.
APPLICATION FILED APR. 25, 1905.

Witnesses
B. Mitchell
A. L. O'Brien

Inventor
John Hartford Chidester
by
Dickerson, Brown, Raegener & Binney
attys

UNITED STATES PATENT OFFICE.

JOHN HARTFORD CHIDESTER, OF DOBBS FERRY, NEW YORK.

ADJUSTABLE WASHER.

No. 811,035.      Specification of Letters Patent.      Patented Jan. 30, 1906.

Application filed April 25, 1905. Serial No. 257,310.

*To all whom it may concern:*

Be it known that I, JOHN HARTFORD CHIDESTER, a citizen of the United States, and a resident of Dobbs Ferry, New York, have invented certain new and useful Improvements in Adjustable Washers, of which the following is a specification.

My invention relates to adjustable washers adapted to be used on milling-machines or wherever it is desired to separate two cutters or other movable parts on a mandrel and to adjust the distance between such cutters or parts accurately and rigidly.

Figure 1:
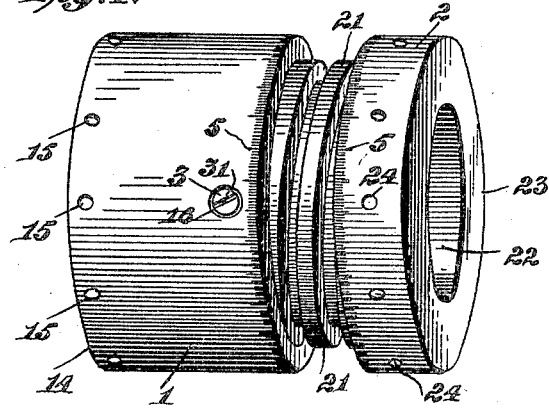
Figure 2:
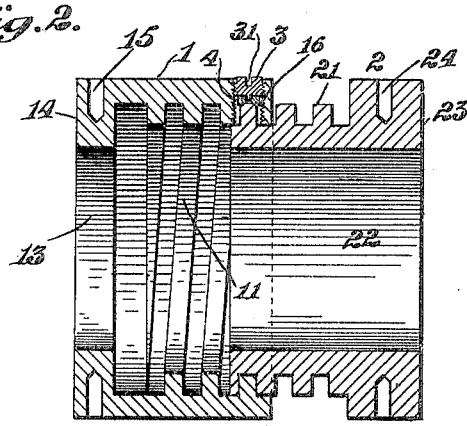
Figure 3:
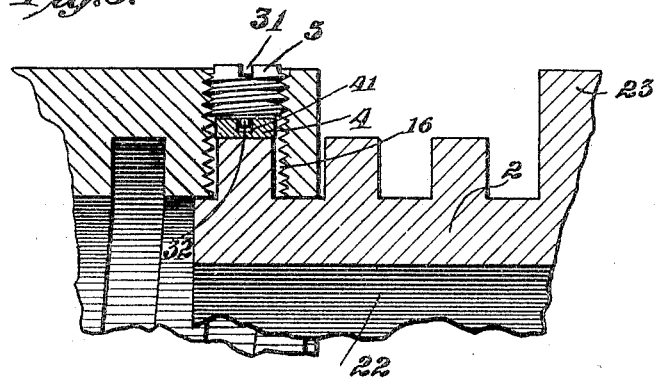

In the drawings, Figure 1 represents in perspective an adjustable washer embodying my invention. Fig. 2 is a longitudinal section through such washer. Fig. 3 is a partial longitudinal section, on an enlarged scale, showing a detail.

1 and 2 designate, respectively, the outer and inner portions of the washer, the part 1 being provided with inside threads 11 and the part 2 with corresponding outside threads 21. In each is a bore, marked 13 and 22, respectively, both of the same size and both adapted to slide on the particular size of mandrel for which they are intended. It will be seen that the bore 13 of the portion 1 is made in an interiorly-extending flange, as clearly shown in Fig. 1. At the ends or collar portions 14 and 23, respectively, each part is provided with wrench-engaging means, shown in this particular embodiment of my invention as a plurality of sockets 15 and 24, respectively, adapted to engage with a socket-wrench. It is of course understood that any other well-known form of wrench-engaging means may be used, as desired. At the inner end of the portion 1 of the washer is drilled or tapped an aperture 16, in which engages a set-screw 3, provided with a slot 31 at its outer end and at its inner end with a nipple 32, engaging in a corresponding recess 41 of a lock-nut washer 4. It will be noted that the threads 11 and 21 of the portions 1 and 2, respectively, are of square pattern, whereby strength is secured and whereby the washer 4 is adapted to engage strongly with the outside thread 21 of the portion 2 without marring or injuring it.

I have shown the exteriorly-extending flange or collar portion 23 of the part 2 as of approximately the same interior diameter as the body of the outer portion 1. This is of advantage in connection with the micrometer-scales 5 shown. It is of course essential that this flange 23 should be of sufficient size to afford a satisfactory end bearing.

It is of course understood that the set-screw and washer may be replaced by similar well-known set-screw or locking devices and that other changes may be made therein without departing from my invention.

It will be seen that the washer is capable of considerable extension and that being once firmly forced out to its operative position the setting down of the screw 3 will effectually prevent any loosening of the washer, by which the parts may be rotated one upon the other and by which rotation the cutters or other devices intended to be held securely on the mandrel might be shifted.

By providing the adjacent edges of the cylindric portions of the parts 1 and 2 with a micrometer-scale 5, as shown in Fig. 1 of the drawings, the parts may be adjusted with great accuracy and may be reset after they have been taken down, so as to secure precisely the same distance between the cutters for the second piece of work.

Without enumerating equivalents or specifying materials, what I claim is—

1. An adjustable washer comprising two hollow portions of like bore having outer annular faces at approximately right angles with their bores and of substantial width and having coöperating threads having flat surfaces, and a screw-lock passing through the wall of the outer portion and engageable with the flat face of the thread of the inner portion when said portions are in any of a plurality of relative positions.

2. An adjustable washer comprising two hollow portions of like bore having outer annular faces at approximately right angles with their bores and of substantial width and having coöperating threads, wrench-engaging means on each of said portions, and a locking device for retaining said portions in any of a plurality of adjusted positions.

3. An adjustable washer comprising two hollow portions of like bore having coöperating threads, a locking device for retaining them in any of a plurality of adjusted positions, and a micrometer-scale on their exterior surfaces.

4. An adjustable washer comprising two hollow portions of like bore having coöperating threads, the outer portion having its end face approximately perpendicular to its bore and of substantial width, the inner portion having a collar or exteriorly-extending flange portion, and a locking device for retaining said portion in any of a plurality of adjusted positions.

5. An adjustable washer comprising two hollow portions of like bore having coöperating threads, the outer portion having its end face approximately perpendicular to its bore and of substantial width, the inner portion having a collar or exteriorly-extending flange portion, the exterior diameter of which is approximately equal to that of said outer portion, and a locking device for retaining said portions in any of a plurality of adjusted positions.

6. An adjustable washer comprising two hollow portions of like bore having coöperating threads, the inner portion having a collar or exteriorly-extending flange portion, the exterior diameter of which is approximately equal to that of said inner portion, a micrometer-scale on the adjacent edges of said portions, and a locking device for retaining said portions in any of a plurality of adjusted positions.

7. An adjustable washer comprising two hollow portions of like bore having coöperating threads, the outer portion having its end face approximately perpendicular to its bore and of substantial width, the inner portion having a collar or exteriorly-extending flange portion, wrench-engaging means on said collar, and a locking device for retaining said portions in any of a plurality of adjusted positions.

8. An adjustable washer comprising two hollow portions having outer annular faces at approximately right angles with their bores and of substantial width and having coöperating threads, the outer portion having an interiorly-extending flange, the bore of which is equal to that of the inner portion and the inner portion having an exteriorly-extending flange, and a locking device for retaining said portions in any of a plurality of adjusted positions.

In testimony whereof I have signed this specification in the presence of two subscribing witnesses.

JOHN HARTFORD CHIDESTER.

Witnesses:
  GEO. L. COOPER,
  A. L. O'BRIEN.